Jan. 2, 1934.         C. S. JENNINGS         1,941,899
                         CONVEYER
              Filed April 6, 1931        2 Sheets-Sheet 2
*Fig. 9.*
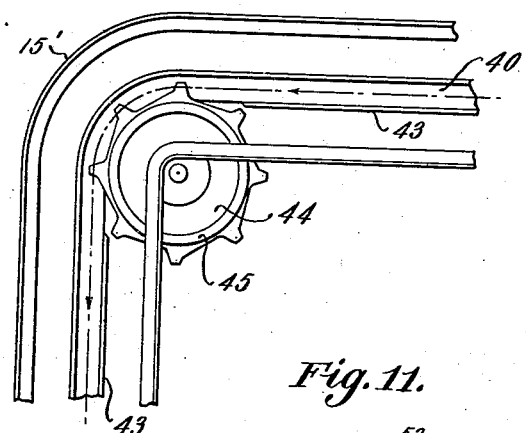
*Fig. 10.*
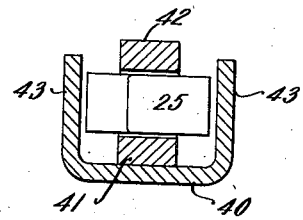
*Fig. 11.*   *Fig. 12.*
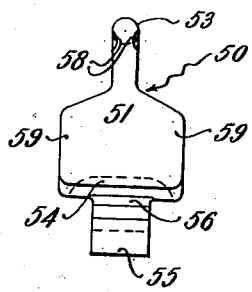  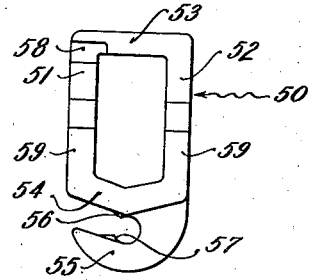
*Fig. 13.*   *Fig. 14.*
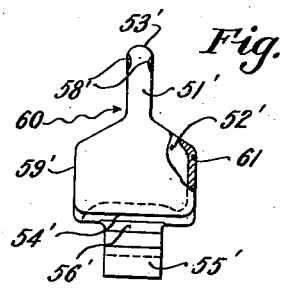  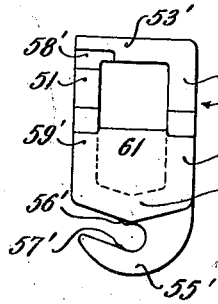
*Fig. 15.*
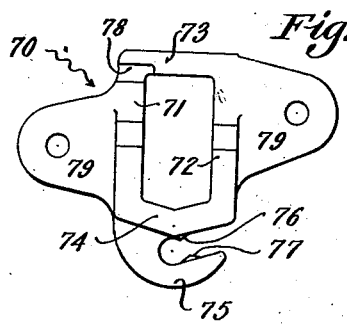
Inventor,
Chester S. Jennings,
by Roberts, Cushman & Woodberry.
Attys.

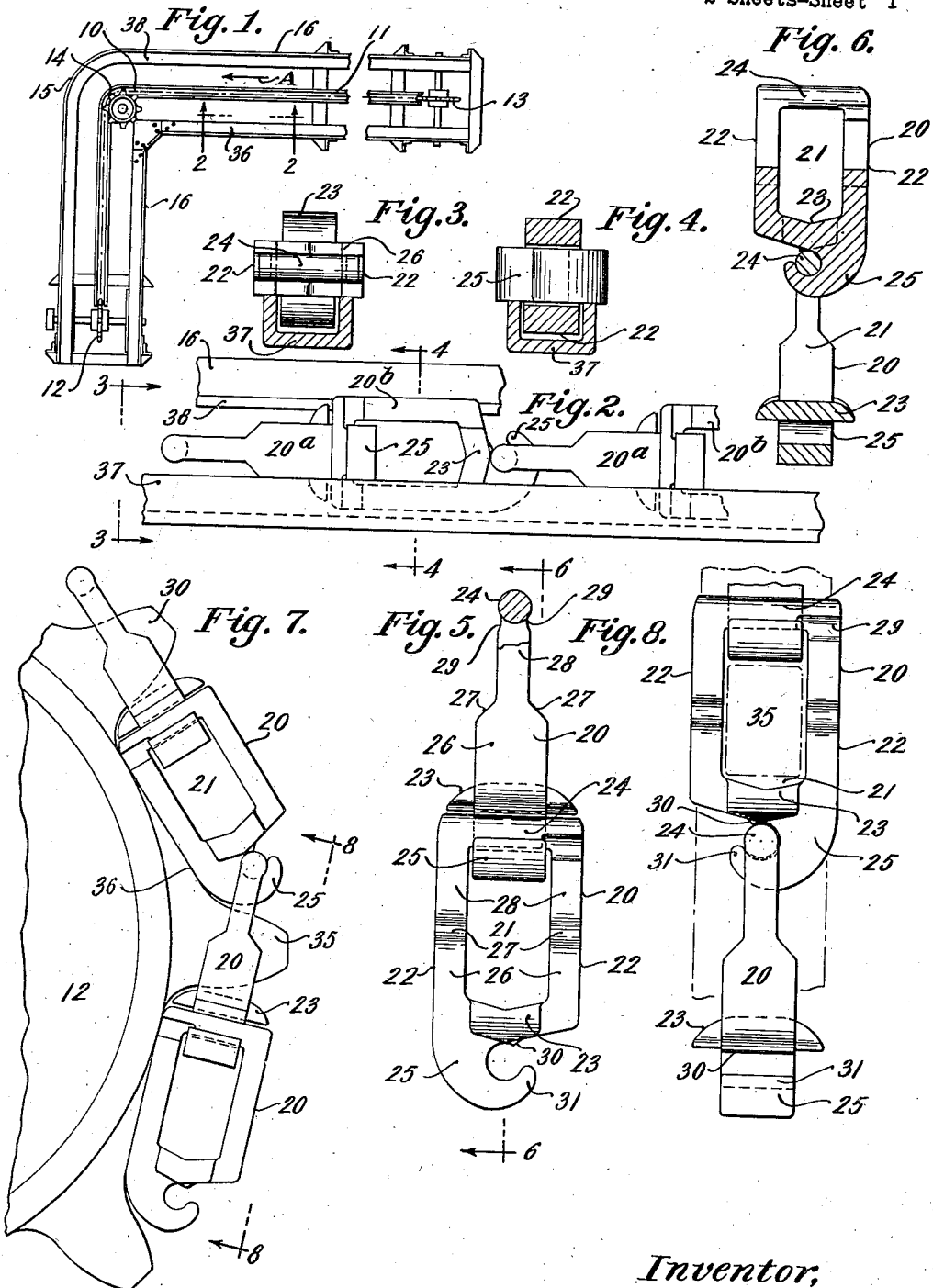

Patented Jan. 2, 1934

1,941,899

UNITED STATES PATENT OFFICE 1,941,899

CONVEYER

Chester S. Jennings, Syracuse, N. Y., assignor to The Lamson Company, Syracuse, N. Y., a corporation of Massachusetts Application April 6, 1931. Serial No. 527,862

2 Claims. (Cl. 198—189)

This invention relates to an improvement in conveyers and more particularly in conveyer chains by which articles are transported along a path, the course of travel of the articles and chain being defined by guide walls or the like between which the chain passes.

The primary object of this invention is to provide a conveyer chain constructed for traveling in different directions in the same or different planes and for being driven in planes at right angles to each other, which chain can make a very sharp turn and be guided around a corner by a sprocket which may be a driver or a free turning idler sprocket the teeth of sprocket engaging the chain and preventing any climbing thereof.

A further object of this invention is to provide a chain in which, when traveling along a plane, alternate links may support the weight of the load while the remaining links may support and guide the chain, such links being identical in construction, and, when turning a corner, the load supporting links engage the teeth of the drive or idler sprocket.

Other objects will appear from an examination of the following description and of the drawings which form a part thereof and in which:

Fig. 1 is a plan view illustrating diagrammatically an installation embodying this invention;

Fig. 2 is an enlarged side elevation taken substantially along the line 2—2 of Fig. 1 illustrating the relation of the chain links and the guideway;

Figs. 3 and 4 are detailed sectional views taken along the lines 3—3 and 4—4 of Fig. 2 illustrating the relation of the guideway with one of the chain links;

Fig. 5 is an enlarged view of two adjacent links of the chain;

Fig. 6 is a reduced sectional view taken along the line 6—6 of Fig. 5;

Fig. 7 is a fragmentary side elevation illustrating the relation of the chain links to a sprocket;

Fig. 8 is an elevation taken in the direction indicated by the line 8—8 on Fig. 7 and the arrows associated therewith;

Fig. 9 is a plan view similar to Fig. 1 illustrating another installation embodying this invention;

Fig. 10 is an enlarged sectional view illustrating the relationship of the chain and guideway in the installation shown in Fig. 9; and Figs. 11 to 15 are elevation views of other types of links which may be assembled to form chains embodying this invention.

In the drawings are illustrated two applications of this invention to the transportation of loads such as cans, boxes or the like along a path, which loads engage with the chain and are advanced thereby. The path of travel often includes sections at right angles to each other and great difficulties have heretofore arisen in connection with guiding the chain around the corner, which difficulties are overcome by the use of a chain embodying this invention. Certain of these difficulties are the inability of the chain to make a sharp turn and the consequent waste of space; the excessive expenditure of power in dragging the chain around such a turn; and the tendency of the chain to climb out of the guideway when making the turn due to the impossibility of providing restraining elements across the guideway.

Fig. 1 illustrates a conveyer by which cans, boxes or the like are transported in the direction indicated by the arrow A by the upper run of a chain 10 embodying this invention. The chain 10 travels in a guideway 11 between end sprockets 12 and 13 and passes around intermediate sprockets 14 by which the chain is compelled to make a turn of ninety degrees at the corner 15. As here shown the sprocket 12 is positively driven from any prime mover acting upon a pulley fixed on the shaft thereof while the sprockets 13 and 14 are of the free running idler type. It will be understood that there are two sprockets 14, one meshing with the upper run of the chain and the other meshing with the lower run thereof although only the upper sprocket is shown in the drawings. Guard rails 16 are mounted upon the conveyer frame in any well known manner to assist in holding the loads to the path. In place of the turn of ninety degrees at the corner 15 the chain 10 may make a turn of any desired degree and I am not limited to the particular turn here shown and described.

The chain 10 comprises a plurality of identical links 20 shown more clearly in Figs. 5 and 6. Each link 20 comprises a recess 21 which receives the sprocket tooth and which is defined by side walls 22 and end walls 23, 24. One side wall is continued beyond the end wall 23 to form a hook 25. The end wall 24 is substantially cylindrical in cross section and when the links are connected the wall 24 of each link is engaged by the hook 25 of the adjacent link. The hook 25 is of such height that it enters the recess 21 and has a slight lateral movement therein limited by the side walls 22. The ends 26 of the side walls 22 adjacent the wall 23 are of the same height as the hook 25 but taper at 27 intermediate their length so that the other ends 28 have the height of the wall 24. Preferably, as shown in Fig. 5 grooves 29 are provided in the opposite faces of one side wall and the end wall 24. The end wall 23 projects above and below the ends 26 of the side walls so that its height is substantially the same as the distance across the link between the outer edges of the side walls.

From the above description it is apparent that each link is pivoted to one adjoining link upon an axis at right angles to the axis upon which it is pivoted to the other adjoining link. This interengagement of adjoining links permits the links adjoining any selected link to move freely in planes at right angles to the plane of that link, the plane of movement of one adjoining link being however at right angles to the plane of movement of the other adjoining link. Consequently the chain is free to travel in the same plane in directions at right angles or even less than right angles to each other without difficulty and without placing any undue strain or pressure thereon. Moreover considering any two adjoining links as a unit the similar units adjoining such unit are movable in the same plane at right angles to that of the intermediate unit.

Formed on the end wall 23 is a tip 30 which is spaced from the tip 31 of the hook 25 a distance less than the diameter of the wall 24 but greater than the space between the bottoms of the grooves 29. Thus, any two links can be quickly and easily separated by swinging them into such a position that the tips 30 and 31 of one link align with the grooves 29 of the other link, whereupon they can be disengaged by shifting either laterally of the other. Obviously the links can be interengaged by reversing the operations above described.

The sprockets preferably employed with the chain are as shown particularly in Fig. 7 of the "gap tooth" type, so that alternate links of the chain are engaged. Each tooth 35 enters the recess 21 of a link between the end wall 23 of that link and the hook 25 of the adjacent link. The surface 36 of the sprocket between teeth 35 upon which rests the link connecting the links engaged by the teeth is inclined as shown in Fig. 7 so that the impulse is transmitted between each tooth and the end wall 23 of the link the recess of which is entered.

Referring particularly to Figs. 2, 3 and 4 it will be noted that the chain guideway 11 comprises a channel bar 37 which receives on its upper edges the hook 25 and ends 26 of the side walls 22 of alternate links 20ª and the end walls 23 of the intermediate links 20ᵇ.

The guard rails 16 are preferably angle bars the horizontal flanges 38 of which extend under the edges of the loads and coact with the chain to support them. The links 20ª are below the guard rail flanges 38 but the upper side wall 22 of each of the links 20ᵇ projects into the plane of the flanges to engage the loads and carry them along the path. Since the links 20ª which rest chiefly upon the channel bar merely connect the load supporting links 20ᵇ which rest at one point only upon the channel bar 37 that bar offers little frictional resistance to the travel of the chain by reason of the weight of the loads.

The teeth of the sprockets 12 and 13 which coact to move the chain through the guideway enter the recesses 21 of the connecting links 20ª but the teeth of the intermediate sprocket 14 enter the recesses 21 of the links 20ᵇ. Since these links 20ᵇ act, as pointed out above, to move the loads it is apparent that the loads will be positively transported around the corner 15. Moreover, the teeth of the sprocket 14 prevent any tendency of the chain to climb out of the guideway.

Figs. 9 and 10 illustrate an installation of the chain embodying this invention and differing from that previously described by the form of the chain guideway and corner sprocket. The channel bar 40 of the guideway of this installation is deeper and wider than the channel bar 37 of the Fig. 1 installation and the lower side walls 41 of the load supporting links rest upon the bottom of the guideway while the upper side walls 42 project out of the guideway and engage the load. The inside flange 43 of the bar 40 is cut away at the corner 15' to permit the sprocket 44 to engage the load carrying links and in order to replace the cutaway portion the sprocket 44 is provided with an annular boss 45.

The link 50 (Figs. 11 and 12) corresponds in general to the link 20 previously described comprising side walls 51, 52 a substantially cylindrical end wall 53, an opposite end wall 54 and a hook 55 beyond the wall 54. On the end wall 54 and the hook 55 are formed tips 56, 57 which prevent the separation of the links except when in alignment with the grooves 58 in the walls 51, 53. The portions 59 of the side walls 51, 52, adjacent the end wall 54 are raised to the height of that wall and thus when the links act to support the loads in the manner shown for example in Fig. 10, increase their surface contact therewith.

The link 60 shown in Figs. 13 and 14 embodies the same elements as the link 50. Such elements are therefore indicated thereon by primes of the numerals employed in Figs. 11 and 12 and will not be further described. The space between the portions 59' is closed at one end by a wall 61 which provides a relatively broad continuous surface on which the loads may rest under certain conditions. When a chain comprising the links 60 is employed the sprockets engaging the load supporting links would necessarily be in vertical planes but the sprockets engaging the connecting links would be in a horizontal plane as in the other types of chains.

The link 70 shown in Fig. 15 comprises side walls 71, 72, a substantially cylindrical end wall 73, an opposite end wall 74, and a hook 75 beyond the wall 74. On the end wall 74 and the hook 75 are formed tips 76, 77, and in the walls 71, 73 are formed grooves 78. Projecting from and preferably integral with the side walls 71, 72 are perforated ears 79. This type of link is intended for overhead work and is used with the other types of links, particularly the links 20, being spaced at intervals, one ear 79 connected to a trolley and the other to a load. The ears 79 must be in a vertical plane and the sprockets meshing with the links 70 in a horizontal plane.

It will be noted that each type of link comprises a cylindrical end wall at one end and a hook at the other end, the hook of each type of link being adapted to engage the cylindrical end wall of any type of link. Thus, a chain may be made of any desired arrangement of links depending upon the use in which it is employed.

While several embodiments and applications of this invention have been shown and described I am not limited thereto since other embodiments and applications may be made without departing from the spirit and scope of the invention as set forth in the following claims.

I claim:

1. A conveyer chain made up of a plurality of links, each link having a recess adapted to receive the tooth of a sprocket and bounded by side and end walls, one of said side walls being extended to form a hook beyond one end wall, said end wall extending in a plane at right angles to the plane of the hook and side walls and the other end wall being substantially cylindrical and extending in a plane parallel to that of the hook and side walls, said last named end wall being adapted to be engaged by the hook of one adjoining link, and the end wall thereof which extends in a plane at right angles to the plane of the hook.

2. A conveyer chain made up of a plurality of links, each link having a recess adapted to receive the tooth of a sprocket and bounded by side and end walls, one of said side walls being extended to form a hook beyond one end wall, said end wall extending in a plane at right angles to the plane of the hook and side walls and the other end wall being substantially cylindrical and extending in a plane parallel to that of the hook and side walls, said last named end wall being adapted to be engaged by the hook of one adjoining link which hook enters the recess of the first named link and coacts with the first named end wall of that link to limit the movement of the sprocket tooth in the recess in two directions, and the first-named end wall of the adjoining link being adapted to engage and lie in the plane of the last-named end wall of the first-named link.

CHESTER S. JENNINGS.